Figure 1:
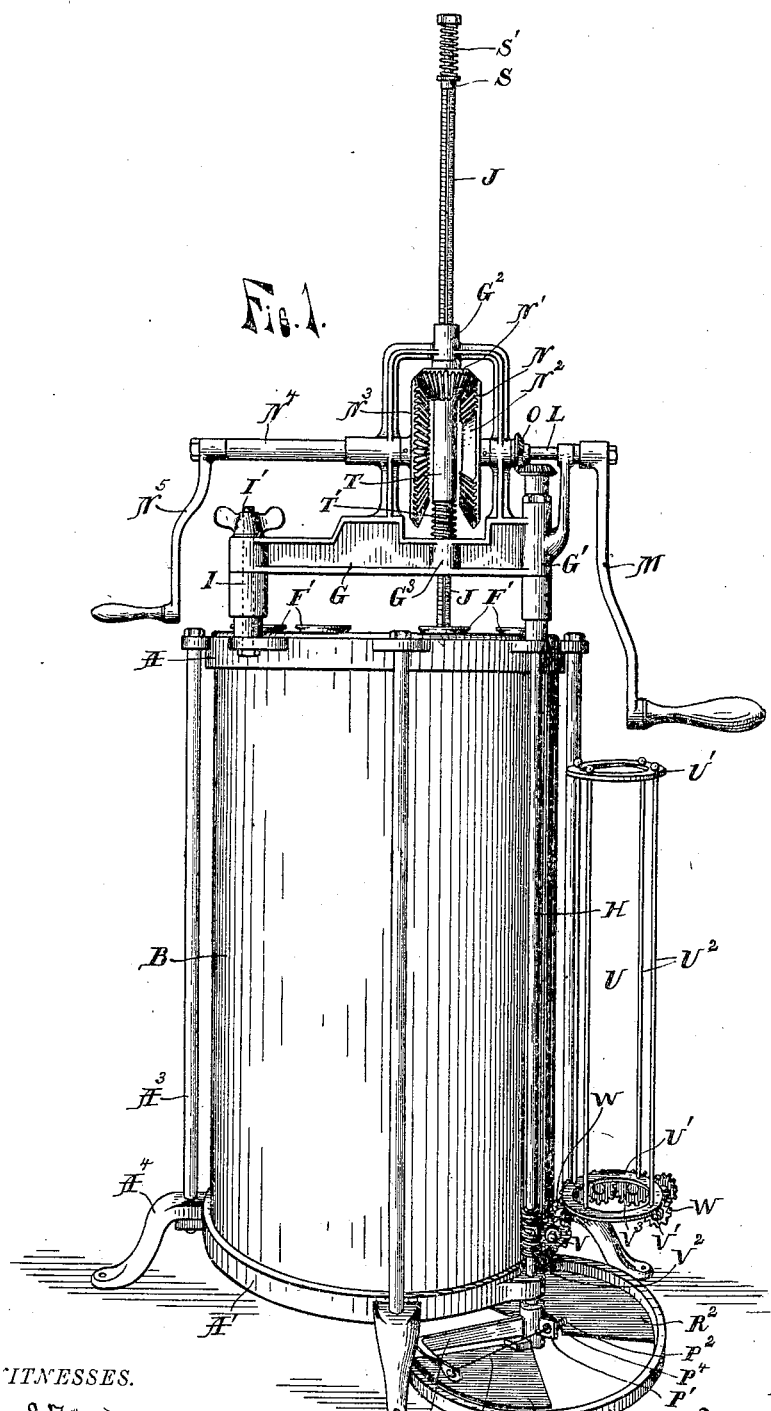

No. 768,704. PATENTED AUG. 30, 1904.
E. O. SUTTON.
MACHINE FOR FORMING BUTTER PATS.
APPLICATION FILED DEC. 30, 1903.
NO MODEL. 2 SHEETS—SHEET 1.

WITNESSES. INVENTOR.
Lewis E. Flanders Edgar O. Sutton
Thomas D. Longstaff By
Attorneys.

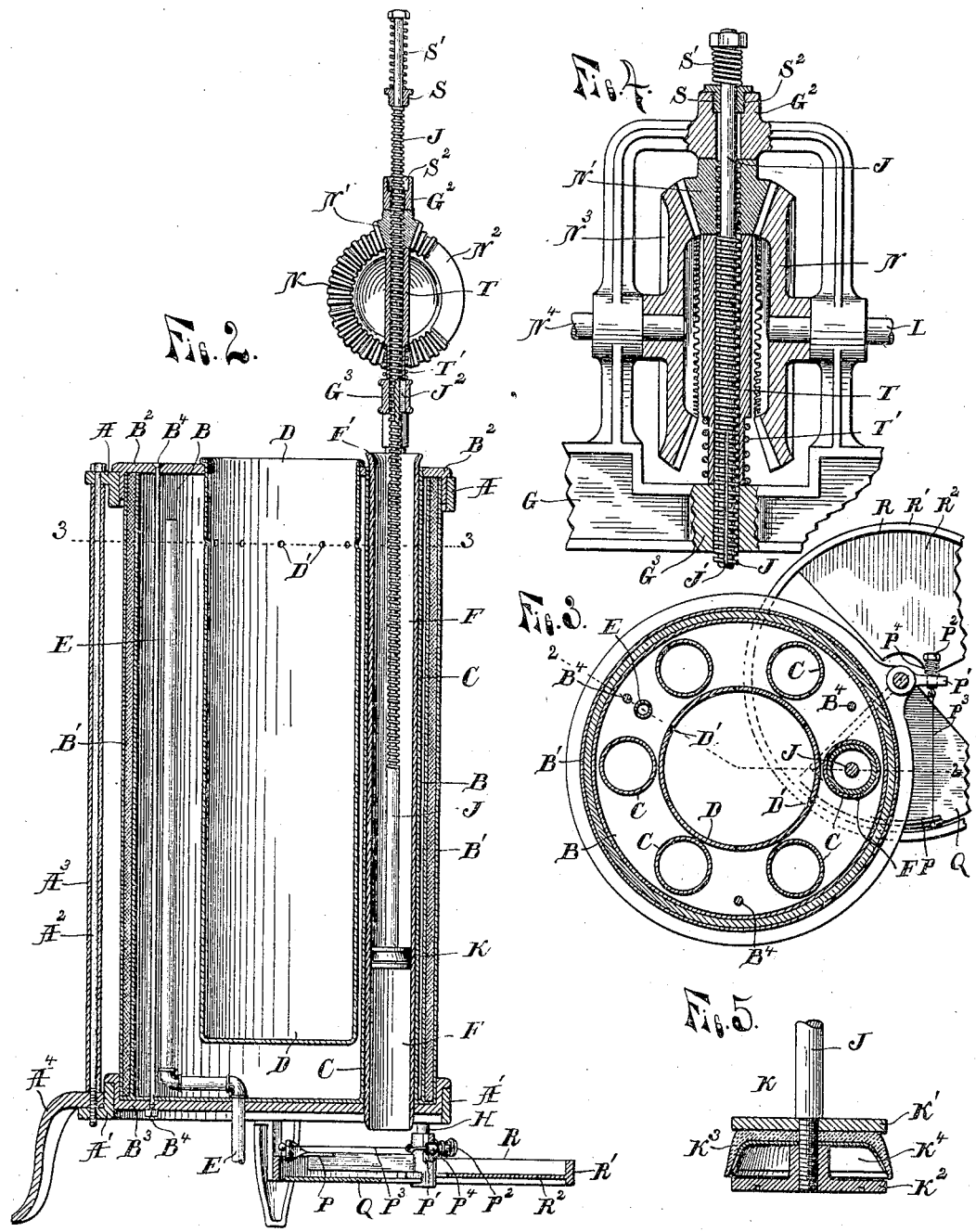

No. 768,704.

Patented August 30, 1904.

UNITED STATES PATENT OFFICE.

EDGAR O. SUTTON, OF DETROIT, MICHIGAN.

MACHINE FOR FORMING BUTTER PATS.

SPECIFICATION forming part of Letters Patent No. 768,704, dated August 30, 1904.

Application filed December 30, 1903. Serial No. 187,150. (No model.)

*To all whom it may concern:*

Be it known that I, EDGAR O. SUTTON, a citizen of the United States of America, residing at Detroit, in the county of Wayne and State of Michigan, have invented certain new and useful Improvements in Machines for Forming Butter Pats, of which the following is a specification, reference being had therein to the accompanying drawings.

This invention relates to improvements in machines for molding or forming butter or like substances into small cakes or pats for individual table use; and its object is to provide a machine for the purpose which will do the work with despatch and accuracy, and is especially adapted for use in hotels or similar places where quantities of these pats are used, each being placed upon a small individual dish.

A further object of the invention is to provide means for automatically feeding the plates one at a time to the machine to receive the pats as they are formed; and the invention consists in the particular construction, arrangement, and combination of parts, all as hereinafter more fully described, and shown in the accompanying drawings, in which—

Figure 1 is a perspective view of a device embodying the invention; Fig. 2, a transverse vertical section of the same on the line 2 2 of Fig. 3; Fig. 3, a section on the line 3 3 of Fig. 2; Fig. 4, an enlarged detail of the gearing and adjacent parts, and Fig. 5 a detail showing the plunger-head in section.

As shown in the drawings, a frame is formed by a top and a bottom ring A and A', each provided with ears to receive the bolts $A^2$ for securing the rings together, and sleeves $A^3$ are provided on said bolts for spacing the rings apart, legs $A^4$ being secured to the ears of the lower ring for supporting the frame at a distance from the floor. Supported upon this frame and free to turn thereon is a cylindrical tank B, provided with a double outer wall B', with asbestos or other suitable nonconducting material between and with heads $B^2$ and $B^3$ securely tied together, with the tank between, by the tie-bolts $B^4$. Extending vertically upward within the tank near its outer wall and opening through the heads thereof is a series of tubes C, and extending downward within the axis of the tank to near the bottom thereof is an ice-receptacle D, which is provided with a flange at its upper end to engage the head of the tank and hold the receptacle suspended therein. This receptacle D is provided with a series of openings D' in its side wall near its upper end, through which the water may overflow into the tank B as the ice melts, and an overflow-pipe E extends through the bottom of the tank and upward therein to a point above the openings to allow the water in the tank to run off when said tank has become filled by the overflow from the ice-receptacle to a level above the upper end of said pipe.

A butter-tube F or a number of such tubes is provided to hold the butter, said tubes being sharpened at their lower ends, so that they may be easily forced downward in a tub of butter and, thus filled, and of such a size that they may be easily inserted or removed from the tubes C. When in position within the tubes, the butter-tubes F project through the lower head $B^3$ of the tank a short distance, and their upper ends are flared at F' to engage the upper head $B^2$ and hold the tubes in place within the cooling-tubes C. The icewater overflowing from the ice-tank surrounds the cooling-tubes and quickly cools the butter in the butter-tubes therein, the water being kept cold by the ice in the tank and protected from the heat by the outer double wall B'.

Supported upon ears on the upper ring A of the stationary frame is a frame G, which is provided with a bearing G' at one end for a vertical shaft H, extending downward through the adjacent ear on the upper ring and an ear on the lower ring and upon which shaft said frame may be swung, its opposite end being supported by a vertical post I on the upper ring, to which post the frame is detachably secured by a thumb-screw I', so that it may be swung laterally from over the tank. Bearings $G^2$ and $G^3$ are also provided on the frame G for a vertically-extending screw-threaded plunger-rod J, provided with a head K at its lower end adapted to be forced into the upper end of one of the butter-tubes and push the butter out of the lower end thereof. The head K consists of a disk K', provided with an axial screw-threaded opening to engage the lower reduced and screw-threaded end of the rod J, which disk is turned up against the shoulder thus formed on the rod, and a similar disk $K^2$, having a hub portion, is screwed upon said reduced end of the rod with a cupped leather washer $K^3$ between, said washer being internally backed up by a cupped spring-metal washer $K^4$, which washers are thus clamped between the disk K' and the hub of the disk $K^2$. The leather washer $K^3$ is thus spread by the spring-washer $K^4$ within and held firmly in contact with the wall of the tube when inserted therein, the upper end of the tube F' being flared, so that the plunger-head will enter without catching. To force the plunger gradually downward into one of the butter-tubes, a short horizontal shaft L is mounted in bearings on the frame G, and on the outer end of this shaft is a hand-crank M, and on its inner end is a bevel-gear N in mesh with a bevel-pinion N', mounted on the plunger-rod J and internally screw-threaded to engage the screw-thread of said rod. The rod J is provided with a longitudinal groove J', and in the bearing $G^3$ is a feather $J^2$ to engage said groove and prevent the rod from turning, but allowing it to move longitudinally, so that as the pinion N' is revolved by the gear N it will turn upon the rod and by its screw-threaded engagement therewith force the rod downward.

The vertical shaft H receives motion from the shaft L by means of the bevel-gears O, and to the lower end of said shaft is secured a laterally-extending arm P, provided with a forwardly-bent end having a vertical slot, and a lug P' on the hub of said arm is provided with an opening through which is adapted to project a tension-nipple $P^2$ on the end of a screw-threaded wire, to which one end of a cutting-wire $P^3$ is secured, the opposite end of said cutting-wire being secured to the forward end of the arm P by being provided with a ball or enlarged end and slipped into the slot of said arm with the ball engaging the outer side thereof. A coiled spring $P^4$ is sleeved on the nipple $P^2$ to engage the head thereof at one end and the side of the lug at its opposite end and put a tension on the cutting-wire, at the same time allowing it to give, so that it will not be as apt to break when subjected to a heavy strain.

Secured to the lower end of the shaft H a short distance below the arm P is a table Q, extending beneath the cutter $P^3$ and revolving therewith as the shaft turns, and stationarily supported from the lower ring A' or otherwise supported in fixed relation to the shaft H is a tray R consisting of a circular rim R' and a bottom $R^2$, projecting inward from one side of the rim to near the shaft H. This bottom fills only a portion of the space within the rim and lies in a plane above that in which the table Q revolves, so that said table will pass beneath said bottom as the shaft H revolves and the arm P will sweep over the surface of the same. Thus when a small dish to receive the butter pat is placed on the tray-bottom it will be swept off by the arm to the table Q and in such a position that when a pat of butter is severed from the lower end of the column pressed out of the butter-tube it will fall upon the plate, which is then removed before the table again reaches and passes beneath the tray-bottom.

In order that the pat of butter may be severed from the column at right angles thereto, it is necessary to stop feeding the column downward during the time in which the cut is being made, and to accomplish this a portion of the bevel-gear N is left blank, as shown at $N^2$. When the plunger has reached the lower end of its movement, to allow it to be turned still farther to turn the table without being fed downward the screw-thread is left off the rod for a distance at its upper end, and on this portion is sleeved a washer S and a coiled spring S', said spring being interposed between said washer and a nut on the end of the rod, so that as the pinion N' is turned and forces the rod downward the washer S will engage the socket $S^2$ in the bearing $G^2$ to guide the rod, the spring will be compressed until the thread on the rod runs out of the pinion, when the pinion will run free on the rod and the spring S' will hold the rod up, so that when the pinion is turned in the opposite direction the thread thereon will at once engage the thread of the rod and the plunger will be lifted.

In engagement with the pinion N' at the side thereof opposite that engaged by the gear N is a bevel-gear $N^3$ on one end of a short horizontal shaft $N^4$, mounted in a bearing on the frame, and a crank-handle $N^5$ on its opposite end, by means of which the gear is turned and motion imparted to the pinion N' and the plunger-rod raised. When the plunger-head is raised out of the butter-tube, the frame may be turned laterally upon the shaft H from over the tank, and the ice-receptacle may then be lifted out for the purpose of cleaning. The tank may be turned to bring the next butter-tube in position to receive the plunger by simply raising the plunger out of the exhausted butter-tube and turning the tank until the next tube registers therewith.

To prevent the pinion N' from turning slightly while passing the blank $N^2$ of the gear N, so that the teeth will not mesh when the teeth of the gear again engage the pinion, a friction is put upon said pinion by a sleeve T on the plunger-rod, which sleeve is forced upward against the lower side of the pinion by a spring T', sleeved on the reduced lower end of said sleeve and causing a friction sufficient to prevent the pinion from being accidentally turned when not engaged by the teeth of the gear N.

To feed the small dishes or plates to the tray R one at a time and in timed relation to the movement of the cutter, a rack U to hold a vertical column or stack of these dishes is secured to the stationary frame and consists of end rings U' of sufficient size to allow the dishes to pass through and provided with openings to receive vertical rods U² to prevent the dishes from escaping laterally. Two short parallel shafts V and V' are provided below the lower ring, one at each side thereof, and on each of these shafts is secured a spur-wheel W, the teeth of which project into the path of the plates and engage the opposite edges thereof to support the stack and release one at a time as the wheels are turned by a worm V² on the shaft H in engagement with a gear on the end of the shaft V, from which shaft motion is transmitted to the shaft V' by a train of gearing V³.

Having thus fully described my invention, what I claim is—

1. In a machine for forming butter pats, the combination of a cooling-tank, a series of cooling-tubes extending through said tank near its outer wall, an ice-tank extending downward within the cooling-tank and provided with a series of openings near its upper end, an overflow-pipe in the cooling-tank, butter-tubes to fit within the cooling-tubes, a plunger to force the butter out of the tubes, and means operating in timed relation to the movement of the plunger for severing the column of butter as it is forced from the tube.

2. In a machine for forming butter pats, the combination with a butter-tube and a cutter for severing the column of butter as it is forced therefrom; of a plunger for forcing the butter from the tube consisting of a head formed of two opposing disks of a size to fit within the tube, a cupped washer and a yielding metal washer within the cupped washer clamped between said disks, and means for forcing said plunger downward within the tube.

3. In a machine for forming butter pats, the combination with a cooling-tank provided with a series of cooling-tubes extending therethrough; of butter-tubes to fit within the cooling-tubes and having flaring upper ends, a plunger-rod having a reduced lower end forming a shoulder, a disk on said end in engagement with the shoulder and of a size to fit within the butter-tube, a cupped washer of fibrous material in engagement with said disk, a flexible metal washer within the cupped washer to spread the same, a disk having a hub portion to engage the washers at the opposite side and bind the same, means for engaging and forcing the plunger into the butter-tube, and a cutter for severing the column of butter as it is forced out by the plunger.

4. In a machine for forming butter pats, the combination with a frame and a butter-tube supported thereby; of a screw-threaded plunger-rod having a longitudinal groove, a plunger-head on said rod to fit within the butter-tube, a feather to engage the groove in the rod and prevent the same from turning, a pinion on said rod provided with an internal screw-thread to engage the thread on the rod, short shafts extending at right angles to said rod at each side thereof, gears on said shafts in engagement with said pinion, one of said gears having a blank portion, cranks on the ends of said short shafts to turn the same, a bevel-gear on the short shaft provided with the gear having the blank portion, a vertical shaft provided with a bevel-gear at one end in mesh with said bevel-gear, and a cutter on the lower end of said vertical shaft for severing the column of butter as it is forced from the tube by the plunger.

5. In a machine for forming butter pats, the combination with a butter-tube and means for severing the column of butter as it is pressed from said tube; of a screw-threaded plunger-rod having a plain portion at its upper end, a plunger-head on said rod, an internally-screw-threaded pinion to engage the screw-thread of the rod and move the same longitudinally until the plunger has reached the lower end of its stroke when the pinion will run free on the plain portion of said rod, a spring to hold the rod in a position to reëngage its thread with the thread of the pinion when said pinion is turned in the opposite direction to lift the rod, a gear for actuating said pinion, and means for actuating said gear and the cutter.

6. In a machine for forming butter pats, the combination with a butter-tube, a plunger to force the butter from said tube; and means for actuating said plunger; of a cutter operated in timed relation to the movement of the plunger for severing the column of butter as it is forced from the tube, a table beneath said cutter movable therewith, and a tray to receive the butter-plates and deliver the same to the table.

7. In a machine for forming butter pats, the combination with a butter-tube, a plunger to force the butter from said tube, and means for actuating said plunger; of a vertical shaft operated in timed relation to the movement of the plunger, an arm on said shaft, a cutter carried by said arm, a table carried by the shaft at a distance below the arm and movable therewith, and a stationary tray to receive the butter-plates and from which they are removed by said arm to the table which passes beneath the tray as the shaft is revolved.

8. In a machine for forming butter pats, the combination with a butter-tube, a plunger to force the butter from said tube, and means for actuating said plunger; of a vertically-extending shaft actuated by said means, an arm secured to the lower end of said shaft and extending outward therefrom, a lug extending outward from the shaft and provided with an opening, a nipple extending through said opening and provided with a head, a spring sleeved on the nipple between its head and the lug, a wire forming a cutter secured at one end to the outer end of said arm and at its opposite end to said nipple, a table secured to the end of the shaft beneath the arm and at a distance therefrom, and a tray stationarily supported in fixed relation to the shaft and consisting of a circular rim and a bottom projecting inward from one side of said rim in a plane above said table and below said arm.

9. In a machine for forming butter pats, the combination with a butter-tube, a plunger to force the butter from said tube, a cutter for severing the column of butter as it is forced from said tube, and means for actuating said plunger and cutter; of means for holding and feeding butter-dishes, one at a time, to receive the pats of butter as they are severed from the column, consisting of a rack to receive a stack of dishes, short shafts at each side of said rack beneath the same, spur-wheels on said shafts to engage the lower dish at opposite sides and feed the dishes down one at a time as the wheels are turned, and means for actuating said wheels in timed relation to the movement of the cutter.

10. In a machine for forming butter pats, the combination of a supporting-frame, a tank supported to turn upon said frame, a series of cooling-tubes extending through said tank, butter-tubes in said cooling-tubes, a vertical shaft in bearings on the supporting-frame, a frame supported upon the supporting-frame and adapted to be turned upon said shaft from over the tank and provided with bearings, a screw-threaded plunger-rod in said bearings, a plunger-head on said rod to fit within the butter-tube, an internally-screw-threaded pinion on said rod, a short shaft mounted in bearings on the swinging frame and extending at right angles to said rod, a gear on said short shaft in mesh with said pinion and having a blank portion, a crank-handle on the outer end of said short shaft, a bevel-gear on the short shaft and a bevel-gear on the vertical shaft in mesh with said bevel-gear, an arm on the lower end of said vertical shaft, a cutter secured to said arm, a table secured to the shaft below the cutter and movable therewith, a worm on said vertical shaft, a vertically-extending rack supported by the machine-frame to receive a stack of dishes and having an open lower end, parallel shafts extending at each side of the rack adjacent to its lower end, spur-wheels on said shafts, a gear on one of said parallel shafts to engage the worm, and gearing to transmit motion from one shaft to the other of said parallel shafts.

11. In a machine for forming butter pats, the combination with the supporting-frame, of a tank having a double outer wall supported by said frame to turn thereon, a series of cooling-tubes extending through said tank, an ice-tank supported in the axis of said tank and having openings near its upper end, an overflow-pipe extending upward in said tank and opening through the bottom thereof, butter-tubes in said cooling-tubes having flaring upper ends, a vertical shaft in bearings on the frame, a swinging frame supported upon the frame and adapted to swing on the vertical shaft, means for securing the swinging frame in position over the tank, a screw-threaded plunger-rod in bearings on the swinging frame and provided with a longitudinal groove and a plain upper end, a feather to engage said groove and prevent the rod from turning, an internally-screw-threaded pinion on said rod adjacent to one of the bearings therefor, a sleeve on the rod, a spring to force said sleeve into frictional contact with said pinion, short horizontal shafts mounted in bearings on the swinging frame at each side of the plunger-rod and extending at right angles thereto, gears on the ends of said shafts engaging said pinion, one of said gears having a blank portion, crank-handles on the opposite ends of said short shafts, bevel-gears connecting one of said shafts and the vertical shaft, a cutter on the lower end of said vertical shaft, a head on the upper end of the plunger-rod, a coiled spring on the plain portion of said rod in engagement with said head, and a washer on said plain portion of the rod in engagement with the opposite end of said spring and adapted to engage a socket in the upper bearing for the rod when said rod is at the lower end of its movement.

12. In a machine for forming butter pats, the combination of a cooling-tank, a series of cooling-tubes extending through said tank near its outer wall, an ice-tank extending downward within the cooling-tank, an overflow-pipe in the cooling-tank, butter-tubes to fit within the cooling-tubes, a plunger to force the butter out of the tubes, and means operating in timed relation to the movement of the plunger for severing the column of butter while in its stationary position.

In testimony whereof I affix my signature in presence of two witnesses.

EDGAR O. SUTTON.

Witnesses:
  OTTO F. BARTHEL,
  LEWIS E. FLANDERS.